United States Patent
Boivin et al.

(10) Patent No.: US 10,259,715 B2
(45) Date of Patent: Apr. 16, 2019

(54) METHOD FOR PREPARING PRECIPITATED SILICAS, NOVEL PRECIPITATED SILICAS AND THE USES OF SAME, IN PARTICULAR FOR REINFORCING POLYMERS

(71) Applicant: RHODIA OPERATIONS, Paris (FR)

(72) Inventors: Cédric Boivin, Chasselay (FR);
Laurent Guy, Rillieux-la-Pape (FR);
Eric Perin, Villefranche sur Saône (FR); Kilani Lamiri, L'Arbresle (FR)

(73) Assignee: Rhodia Operations, Paris (FR)

( * ) Notice: Subject to any disclaimer, the term of this patent is extended or adjusted under 35 U.S.C. 154(b) by 51 days.

(21) Appl. No.: 15/118,716

(22) PCT Filed: Feb. 12, 2015

(86) PCT No.: PCT/EP2015/052921
§ 371 (c)(1),
(2) Date: Aug. 12, 2016

(87) PCT Pub. No.: WO2015/121333
PCT Pub. Date: Aug. 20, 2015

(65) Prior Publication Data
US 2017/0044020 A1    Feb. 16, 2017

(30) Foreign Application Priority Data
Feb. 14, 2014    (FR) .................... 14 00415

(51) Int. Cl.
*C01B 33/193*    (2006.01)
*B29D 30/00*    (2006.01)
(Continued)

(52) U.S. Cl.
CPC ............ *C01B 33/193* (2013.01); *B29D 30/00* (2013.01); *B60C 1/0016* (2013.01); *C08K 3/36* (2013.01);
(Continued)

(58) Field of Classification Search
CPC ....................................................... C08K 3/36
See application file for complete search history.

(56) References Cited

U.S. PATENT DOCUMENTS 5,800,608 A       9/1998 Chevallier
2005/0032965 A1*  2/2005 Valero ............... A61K 8/25
                                                524/493
(Continued)

FOREIGN PATENT DOCUMENTS

EP    1674520 A1    6/2006
FR    2886285 A1    12/2006
(Continued)

*Primary Examiner* — Vu A Nguyen

(57) ABSTRACT

The invention relates to a novel process for preparing a precipitated silica, in which:
  a silicate is reacted with an acidifying agent, so as to obtain a suspension of precipitated silica,
  said suspension of precipitated silica is filtered, so as to obtain a filter cake,
  said filter cake is subjected to a liquefaction operation,
  after the liquefaction operation, a drying step is performed,
characterized in that at least one polycarboxylic acid is added to the filter cake, during or after the liquefaction operation.
The invention also relates to novel precipitated silicas and to uses thereof.

17 Claims, 1 Drawing Sheet

(51) Int. Cl.
*B60C 1/00* (2006.01)
*C08K 3/36* (2006.01)
*C08L 9/06* (2006.01)

(52) U.S. Cl.
CPC ............. *C08L 9/06* (2013.01); *C01P 2006/12* (2013.01); *C01P 2006/14* (2013.01); *C01P 2006/90* (2013.01); *C08L 2205/025* (2013.01)

(56) References Cited

U.S. PATENT DOCUMENTS

| | | | |
|---|---|---|---|
| 2009/0214449 A1* | 8/2009 | Valero | C01B 33/193 424/55 |
| 2015/0266742 A1* | 9/2015 | Clouin | C01B 33/128 423/339 |

FOREIGN PATENT DOCUMENTS

| | | |
|---|---|---|
| FR | 3017610 A1 | 8/2015 |
| WO | 2013092745 A1 | 6/2013 |

\* cited by examiner

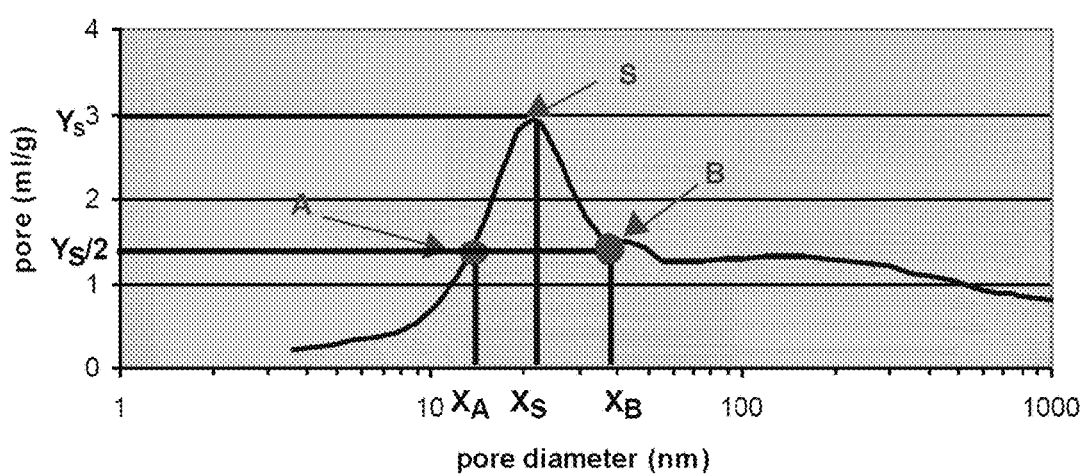

METHOD FOR PREPARING PRECIPITATED SILICAS, NOVEL PRECIPITATED SILICAS AND THE USES OF SAME, IN PARTICULAR FOR REINFORCING POLYMERS

CROSS-REFERENCE TO RELATED APPLICATIONS

The present application is a U.S. national phase entry under 35 U.S.C. § 371 of International Application No. PCT/EP2015/052921, filed on 12 Feb. 2015, which claims priority to French application No. 1400415, filed on 14 Feb. 2014, the entire content of this application being incorporated herein by reference for all purposes.

The present invention relates to a novel process for preparing precipitated silica, to novel precipitated silicas and to applications thereof, such as the reinforcement of polymers.

It is known practice to employ reinforcing white fillers in polymers, in particular elastomers, for instance precipitated silica.

The aim of the present invention is especially to provide an alternative filler for polymer compositions which advantageously afford them a reduction in their viscosity and an improvement in their dynamic properties, while retaining their mechanical properties. It thus advantageously enables an improvement in the hysteresis/reinforcement compromise.

BRIEF DESCRIPTION OF THE DRAWING

FIG. 1 depicts an exemplary pore distribution curve, with points S, A and B indicated for use in calculating an exemplary pore distribution width ldp in accordance with the calculation described herein.

The present invention first of all provides a novel process for preparing precipitated silica using, during or after the liquefaction operation, at least one polycarboxylic acid.

Generally, the preparation of precipitated silica is performed by a precipitation reaction of a silicate, such as an alkali metal silicate (for example sodium silicate), with an acidifying agent (for example sulfuric acid), then separation by filtration, with production of a filter cake of the precipitated silica obtained, followed by liquefaction said filter cake and, finally, drying (generally by atomization). The silica can be precipitated in any mode: in particular, addition of acidifying agent to a silicate feedstock or total or partial simultaneous addition of acidifying agent and of silicate to a feedstock of water or of silicate.

One of the subjects of the invention is a novel process for preparing a precipitated silica, of the type comprising the precipitation reaction between a silicate and an acidifying agent, whereby a suspension of precipitated silica is obtained, followed by separation and drying of this suspension, characterized in that it comprises the following successive steps:
the precipitation reaction is performed in the following way:
(i) an aqueous feedstock with a pH of between 2.0 and 5.0 is formed,
(ii) silicate and acidifying agent are simultaneously added to said feedstock, such that the pH of the reaction medium is maintained between 2.0 and 5.0,
(iii) the addition of the acidifying agent is stopped, while continuing the addition of the silicate to the reaction medium until a pH value of the reaction medium of between 7.0 and 10.0 is obtained,
(iv) silicate and acidifying agent are simultaneously added to the reaction medium, such that the pH of the reaction medium is maintained between 7.0 and 10.0,
(v) the addition of the silicate is stopped while continuing the addition of the acidifying agent to the reaction medium until a pH value of the reaction medium of less than 6.0 is obtained,
the silica suspension obtained is filtered,
the filter cake obtained after the filtration is subjected to a liquefaction operation,
said process being characterized in that at least one polycarboxylic acid (for example a mixture of polycarboxylic acids) is added to the filter cake, either during the liquefaction operation, or after the liquefaction operation and before the drying step.

According to the invention, the filter cake is subjected to a liquefaction operation during which or after which at least one polycarboxylic acid is introduced. The mixture then obtained (suspension of precipitated silica) is subsequently dried (generally by atomization).

The liquefaction operation is a fluidization or disintegration operation, in which the filter cake is rendered liquid, the precipitated silica being once again in suspension.

In a first variant of the invention, this liquefaction operation is performed by subjecting the filter cake to a chemical action by addition of at least one polycarboxylic acid, preferably coupled with a mechanical action (for example, by passing through a continuously stirred tank or through a mill of colloidal type) which normally brings about a reduction in particle size of the suspended silica. The suspension (in particular aqueous suspension) obtained after liquefaction has a relatively low viscosity.

In a second variant, this liquefaction operation is performed by subjecting the filter cake to a mechanical action (for example, by passing through a continuously stirred tank or through a mill of colloidal type) which normally brings about a reduction in particle size of the suspended silica.

In this second variant, at least one polycarboxylic acid is added after the liquefaction operation, that is to say, to the liquefacted silica cake.

The filter cake that is to be subjected to the liquefaction operation may be composed of a mixture of several filter cakes, each of said cakes being obtained by filtration of a portion of the silica suspension obtained after step (v) (this suspension being, prior to the filtration, split into several parts).

According to the invention, the term "polycarboxylic acid" means polycarboxylic acids comprising at least two carboxylic acid functional groups. The term "carboxylic acid functional group" is taken herein in its usual meaning and refers to the —COOH functional group.

The polycarboxylic acid used according to the invention may contain two, three, four or more than four carboxylic acid functional groups.

According to the invention, the polycarboxylic acid is preferably chosen from dicarboxylic and tricarboxylic acids.

According to the invention, the polycarboxylic acid used may be a linear or branched, saturated or unsaturated, aliphatic polycarboxylic acid containing from 2 to 20 carbon atoms or an aromatic polycarboxylic acid. The polycarboxylic acid may optionally comprise hydroxyl groups and/or halogen atoms. The aliphatic polycarboxylic acid may optionally comprise heteroatoms on the main chain, for example N or S. Generally, the polycarboxylic acid used according to the invention is chosen from the group consisting of linear or branched, saturated or unsaturated, aliphatic polycarboxylic acids containing from 2 to 16 carbon atoms and aromatic polycarboxylic acids.

Among the aliphatic polycarboxylic acids, mention may be made of linear, saturated or unsaturated polycarboxylic acids containing from 2 to 14 carbon atoms and preferably from 2 to 12 carbon atoms. The polycarboxylic acid used may contain 2, 3, 4, 5, 6, 7, 8, 9, 10, 11 or 12 carbon atoms. Advantageously, the polycarboxylic acid used may contain 4, 5, 6, 7, 8, 9 or 10 carbon atoms, and preferably 4, 5, 6, 7 or 8 carbon atoms. For example, the polycarboxylic acid used may contain 4, 5 or 6 carbon atoms.

In particular, nonlimiting examples that may be mentioned of linear aliphatic polycarboxylic acids used in the invention include acids chosen from the group consisting of oxalic acid, malonic acid, tricarballylic acid, succinic acid, glutaric acid, adipic acid, pimelic acid, suberic acid, azelaic acid and sebacic acid.

Among the branched polycarboxylic acids, mention may be made of methylsuccinic acid, ethylsuccinic acid, oxalosuccinic acid, methyladipic acid, methylglutaric acid and dimethylglutaric acid. The term "methylglutaric acid" means both 2-methylglutaric acid and 3-methylglutaric acid and also a mixture of these two isomers in all proportions. The term "2-methylglutaric acid" is used to indicate both the (S) and (R) forms of the compound and the racemic mixture.

Among the unsaturated polycarboxylic acids, mention may be made of maleic acid, fumaric acid, itaconic acid, muconic acid, aconitic acid, traumatic acid and glutaconic acid.

Among the polycarboxylic acids comprising hydroxyl groups, mention may be made of malic acid, citric acid, isocitric acid and tartaric acid.

Among the aromatic polycarboxylic acids, mention may be made of phthalic acids, namely phthalic acid, orthophthalic acid, isophthalic acid, trimesic acid and trimellitic acid.

Preferably, the polycarboxylic acid used in the process according to the invention is chosen from the group consisting of oxalic acid, malonic acid, tricarballylic acid, succinic acid, glutaric acid, adipic acid, pimelic acid, suberic acid, azelaic acid, sebacic acid, methylsuccinic acid, ethylsuccinic acid, methyladipic acid, methylglutaric acid, dimethylglutaric acid, malic acid, citric acid, isocitric acid and tartaric acid.

Preferably, the dicarboxylic and tricarboxylic acids are chosen from adipic acid, succinic acid, ethylsuccinic acid, glutaric acid, methylglutaric acid, oxalic acid and citric acid.

The polycarboxylic acid may also be chosen from the group consisting of oxalic acid, malonic acid, tricarballylic acid, succinic acid, glutaric acid, adipic acid, pimelic acid, suberic acid, azelaic acid, sebacic acid, methylsuccinic acid, ethylsuccinic acid, methyladipic acid, methylglutaric acid, dimethylglutaric acid, malic acid, citric acid, isocitric acid and tartaric acid. Preferably, the polycarboxylic acid may be chosen from the group consisting of oxalic acid, malonic acid, succinic acid, glutaric acid, adipic acid, pimelic acid, suberic acid, azelaic acid, sebacic acid, methylsuccinic acid, ethylsuccinic acid, methyladipic acid, methylglutaric acid, dimethylglutaric acid, malic acid, citric acid, isocitric acid and tartaric acid. Very preferably, the polycarboxylic acid may be chosen from the group consisting of succinic acid, glutaric acid, adipic acid, pimelic acid, suberic acid, azelaic acid, sebacic acid, methylsuccinic acid, ethylsuccinic acid, methyladipic acid, methylglutaric acid, dimethylglutaric acid, malic acid, citric acid and tartaric acid.

In a first embodiment of the invention, a single polycarboxylic acid is added to the filter cake.

Preferably, the polycarboxylic acid is then succinic acid.

Preferably, when the polycarboxylic acid is succinic acid, it is added to the filter cake after the liquefaction operation.

In a second preferred embodiment of the invention, a mixture of polycarboxylic acids is added to the filter cake, said mixture comprising at least two polycarboxylic acids as defined above. The mixture may comprise two, three, four or more than four polycarboxylic acids.

Preferably, the polycarboxylic acids of the mixture are then chosen from adipic acid, succinic acid, ethylsuccinic acid, glutaric acid, methylglutaric acid, oxalic acid and citric acid.

According to the invention, the mixture of polycarboxylic acids is preferably a mixture of dicarboxylic and/or tricarboxylic acids, especially a mixture of at least two, preferably of at least three, dicarboxylic and/or tricarboxylic acids, in particular a mixture of three dicarboxylic and/or tricarboxylic acids.

Preferably, the mixture of polycarboxylic acids is a mixture of dicarboxylic acids, especially a mixture of at least three dicarboxylic acids, in particular a mixture of three dicarboxylic acids. In general, the mixture consists of three dicarboxylic acids, although impurities may be present in an amount generally not exceeding 2.00% by weight of the total mixture.

According to a preferred variant of the invention, the mixture of polycarboxylic acids used in the invention comprises the following acids: adipic acid, glutaric acid and succinic acid. For example, the mixture of polycarboxylic acids comprises from 15.00% to 35.00% by weight of adipic acid, from 40.00% to 60.00% by weight of glutaric acid and from 15.00% to 25.00% by weight of succinic acid.

The mixture of polycarboxylic acids according to this first preferred variant of the invention may result from a process for manufacturing adipic acid.

According to another preferred variant of the invention, the mixture of polycarboxylic acids used in the invention comprises the following acids: methylglutaric acid, ethylsuccinic acid and adipic acid. The three acids may be present in the mixture in all proportions. For example, the mixture of polycarboxylic acids comprises from 60.00% to 96.00% by weight of methylglutaric acid, from 3.90% to 20.00% by weight of ethylsuccinic acid and from 0.05% to 20.00% by weight of adipic acid.

The mixture of polycarboxylic acids according to this second preferred variant of the invention may result from a process for manufacturing adipic acid.

Advantageously, the mixture of polycarboxylic acids according to this second preferred variant of the invention may be obtained by acid hydrolysis, preferably by basic hydrolysis, of a mixture of methylglutaronitrile, ethylsuccinonitrile and adiponitrile resulting from the process for manufacturing adiponitrile by hydrocyanation of butadiene, adiponitrile being an important intermediate in the synthesis of hexamethylenediamine.

Some or all of the polycarboxylic acid(s), in particular of the dicarboxylic and/or tricarboxylic acids, used according to the invention may be in the form of a carboxylic acid derivative, namely in the anhydride, ester, alkali metal (for example sodium or potassium) salt (carboxylate), alkaline-earth metal (for example calcium) salt (carboxylate) or ammonium salt (carboxylate) form. The term "carboxylate" will be used hereinbelow to denote the derivatives of carboxylic acid functional groups as defined previously.

For example, the mixture of polycarboxylic acids may be a mixture comprising:

methylglutaric acid (in particular from 60.00% to 96.00% by weight, for example from 90.00% to 95.50% by weight), ethylsuccinic anhydride (in particular from 3.90% to 20.00% by weight, for example from 3.90% to 9.70% by weight), adipic acid (in particular from 0.05% to 20.00% by weight, for example from 0.10% to 0.30% by weight).

The mixture of polycarboxylic acids may also be a mixture comprising:

methylglutaric acid (in particular from 10.00% to 50.00% by weight, for example from 25.00% to 40.00% by weight), methylglutaric anhydride (in particular from 40.00% to 80.00% by weight, for example from 55.00% to 70.00% by weight), ethylsuccinic anhydride (in particular from 3.90% to 20.00% by weight, for example from 3.90% to 9.70%), adipic acid (in particular from 0.05% to 20.00% by weight, for example from 0.1% to 0.3% by weight).

The mixtures used according to the invention may optionally comprise impurities.

The polycarboxylic acids used in the invention may optionally be preneutralized (in particular by pretreating them with a base, for example of sodium hydroxide or potassium hydroxide type) before they are added to the filter cake. This makes it possible in particular to modify the pH of the silica obtained.

The polycarboxylic acids may be used in the form of an aqueous solution.

The amount of polycarboxylic acid(s) used is in general such that the ratio of polycarboxylic acid(s) to amount of silica, expressed as $SiO_2$, contained in the filter cake (at the time of addition of at least one polycarboxylic acid) is between 0.50% and 2.00% by weight, preferably between 0.60% and 2.00% by weight, especially between 0.55% and 1.75% by weight, in particular between 0.60% and 1.50% by weight, for example between 0.65% and 1.25% by weight.

In the invention, the filter cake may optionally be washed.

The use, during or after the liquefaction operation, of at least one polycarboxylic acid and the particular sequence of steps, and in particular the presence of a first simultaneous addition of acidifying agent and of silicate in acidic medium at a pH of between 2.0 and 5.0 and of a second simultaneous addition of acidifying agent and silicate in basic medium at a pH of between 7.0 and 10.0, gives the products obtained their particular characteristics and properties.

The choice of the acidifying agent and of the silicate is made in a way well known per se.

Use is generally made, as acidifying agent, of a strong mineral acid, such as sulfuric acid, nitric acid or hydrochloric acid, or of an organic acid, such as acetic acid, formic acid or carbonic acid.

The acidifying agent may be dilute or concentrated; its normality may be between 0.4 and 36 N, for example between 0.6 and 1.5 N.

In particular, in the case where the acidifying agent is sulfuric acid, its concentration may be between 40 and 180 g/l, for example between 60 and 130 g/l.

Use may be made, as silicate, of any common form of silicates, such as metasilicates, disilicates and advantageously an alkali metal silicate, in particular sodium or potassium silicate.

The silicate may have a concentration (expressed as $SiO_2$) of between 40 and 330 g/l, for example between 60 and 300 g/l, in particular between 60 and 260 g/l.

Preferably, use is made of sulfuric acid as acidifying agent and of sodium silicate as silicate.

In the case where sodium silicate is used, the latter generally has an $SiO_2/Na_2O$ weight ratio of between 2.0 and 4.0, in particular between 2.4 and 3.9, for example between 3.1 and 3.8.

An aqueous feedstock with a pH of between 2.0 and 5.0 is first formed (step (i)).

Preferably, the feedstock formed has a pH of between 2.5 and 5.0, especially between 3.0 and 4.5; this pH is, for example, between 3.5 and 4.5.

This initial feedstock may be obtained by adding acidifying agent to water so as to obtain a pH value in the feedstock of between 2.0 and 5.0, preferably between 2.5 and 5.0, especially between 3.0 and 4.5, for example between 3.5 and 4.5.

It may also be obtained by adding acidifying agent to a water+silicate mixture so as to obtain this pH value.

It may also be prepared by adding acidifying agent to a feedstock containing preformed silica particles at a pH below 7.0, so as to obtain a pH value of between 2.0 and 5.0, preferably between 2.5 and 5.0, especially between 3.0 and 4.5, for example between 3.5 and 4.5.

The feedstock formed in step (i) may comprise an electrolyte.

Preferably, the feedstock formed in step (i) contains an electrolyte.

The term "electrolyte" is understood here in its generally accepted sense, i.e. it means any ionic or molecular substance which, when in solution, decomposes or dissociates to form ions or charged particles. Mention may be made, as electrolytes, of a salt from the group of the salts of alkali metals and alkaline-earth metals, in particular the salt of the metal of the starting silicate and of the acidifying agent, for example sodium chloride in the case of the reaction of a sodium silicate with hydrochloric acid or, preferably, sodium sulfate in the case of the reaction of a sodium silicate with sulfuric acid.

Preferably, when sodium sulfate is used as electrolyte in step (i), its concentration in the initial feedstock is in particular between 8 and 40 g/l, especially between 10 and 20 g/l, for example between 13 and 18 g/l.

The second step (step (ii)) consists of a simultaneous addition of acidifying agent and silicate, such that (in particular at rates such that) the pH of the reaction medium is maintained between 2.0 and 5.0, preferably between 2.5 and 5.0, especially between 3.0 and 4.5, for example between 3.5 and 4.5.

This simultaneous addition is advantageously performed in such a manner that the pH value of the reaction medium is always equal (to within ±0.2) to that reached after the initial step (i).

Next, in a step (iii), the addition of the acidifying agent is stopped while continuing the addition of silicate to the reaction medium so as to obtain a pH value in the reaction medium of between 7.0 and 10.0, preferably between 7.5 and 9.5.

It may then be advantageous to perform just after this step (iii), and thus just after stopping the addition of silicate, maturation of the reaction medium, especially at the pH obtained after step (iii), and in general with stirring; this maturation may last, for example, from 2 to 45 minutes, in particular from 5 to 25 minutes, and preferentially does not comprise any addition of acidifying agent or addition of silicate.

After step (iii) and the optional maturation, a new simultaneous addition of acidifying agent and silicate is performed, such that (in particular at rates such that) the pH of the reaction medium is maintained between 7.0 and 10.0, preferably between 7.5 and 9.5.

This second simultaneous addition (step (iv)) is advantageously performed such that the pH value of the reaction medium is constantly equal (to within ±0.2) to that reached after the preceding step.

It should be noted that it is possible, between step (iii) and step (iv), for example between, on the one hand, the optional maturation following step (iii), and, on the other hand, step (iv), to add to the reaction medium acidifying agent, the pH of the reaction medium after this addition of acid being, however, between 7.0 and 9.5, preferably between 7.5 and 9.5.

Finally, in a step (v), the addition of the silicate is stopped while continuing the addition of acidifying agent to the reaction medium so as to obtain a pH value in the reaction medium of less than 6.0, preferably between 3.0 and 5.5, in particular between 3.0 and 5.0, for example between 3.0 and 4.5.

It may then be advantageous to perform after this step (v), and thus just after stopping the addition of acidifying agent, maturation of the reaction medium, especially at the pH obtained after step (v), and in general with stirring; this maturation may last, for example, from 2 to 45 minutes, in particular from 5 to 20 minutes and preferentially does not comprise any addition of acid or addition of silicate.

The reaction chamber in which the entire reaction of the silicate with the acidifying agent is performed is usually equipped with adequate stirring equipment and heating equipment.

The entire reaction of the silicate with the acidifying agent is generally performed between 70 and 95° C., in particular between 75 and 95° C.

According to one variant of the invention, the entire reaction of the silicate with the acidifying agent is performed at a constant temperature, usually of between 70 and 95° C., in particular between 75 and 95° C.

According to another variant of the invention, the temperature at the end of the reaction is higher than the temperature at the start of the reaction: thus, the temperature at the start of the reaction (for example during steps (i) to (iii)) is preferably maintained at between 70 and 85° C. and the temperature is then increased, preferably up to a value of between 85 and 95° C., at which value it is maintained (for example during steps (iv) and (v)), up to the end of the reaction.

At the end of the steps that have just been described, a silica slurry is obtained, which is subsequently separated (liquid/solid separation).

The separation performed in the preparation process according to the invention usually comprises a filtration, followed by washing, if necessary. The filtration is performed according to any suitable method, for example by means of a band filter, a filter under vacuum or, preferably, a filter press.

The filter cake is then subjected to a liquefaction operation. In accordance with the above account, at least one polycarboxylic acid is added during or after the liquefaction operation.

The liquefacted filter cake is then dried.

This drying may be performed according to any means known per se. Preferably, the drying is performed by atomization. To this end, use may be made of any type of suitable atomizer, in particular a rotary, nozzle, liquid pressure or two-fluid atomizer. In general, when the filtration is performed using a filter press, a nozzle atomizer is used, and when the filtration is performed using a vacuum filter, a rotary atomizer is used.

When the drying operation is performed using a nozzle atomizer, the precipitated silica that may then be obtained is usually in the form of substantially spherical beads. After this drying operation, it is optionally possible to perform a step of milling on the recovered product; the precipitated silica that may then be obtained is generally in the form of a powder.

When the drying operation is performed using a rotary atomizer, the precipitated silica that may then be obtained may be in the form of a powder.

Finally, the dried (in particular by a rotary atomizer) or milled product as indicated previously may optionally be subjected to an agglomeration step, which consists, for example, of direct compression, wet granulation (i.e. with use of a binder, such as water, silica suspension, etc.), extrusion or, preferably, dry compacting. When the latter technique is used, it may prove to be opportune, before performing the compacting, to deaerate (operation also referred to as predensifying or degassing) the pulverulent products so as to remove the air included therein and to provide more uniform compacting.

The precipitated silica that may then be obtained via this agglomeration step is generally in the form of granules.

The invention also relates to the precipitated silicas obtained or capable of being obtained via the process according to the invention.

In general, these precipitated silicas have at their surface molecules of the polycarboxylic acid(s) used and/or of the carboxylate(s) corresponding to the polycarboxylic acid(s) used.

A subject of the present invention is also a precipitated silica with particular characteristics, which may be used especially as an alternative filler for polymer compositions, advantageously affording them a reduction in their viscosity and an improvement in their dynamic properties, while retaining their mechanical properties.

In the account hereinbelow, the BET specific surface area is determined according to the Brunauer-Emmett-Teller method described in the *Journal of the American Chemical Society*, Vol. 60, page 309, February 1938, and corresponding to standard NF ISO 5794-1, Appendix D (June 2010). The CTAB specific surface area is the external surface, which may be determined according to standard NF ISO 5794-1, Appendix G (June 2010).

The content of polycarboxylic acid+corresponding carboxylate denoted (C), expressed as total carbon, may be measured using a carbon/sulfur analyzer, such as the Horiba EMIA 320 V2 machine. The principle of the carbon/sulfur analyzer is based on the combustion of a solid sample in a stream of oxygen in an induction furnace (adjusted to approximately 170 mA) and in the presence of combustion accelerators (approximately 2 grams of tungsten (in particular Lecocel 763-266) and approximately 1 gram of iron). The analysis lasts approximately 1 minute.

The carbon present in the sample to be analyzed (mass of approximately 0.2 gram) combines with the oxygen to form $CO_2$, CO. These decomposition gases are subsequently analyzed by an infrared detector.

The moisture from the sample and the water produced during these oxidation reactions is removed by passing through a cartridge comprising a dehydrating agent (magnesium perchlorate) so as not to interfere with the infrared measurement.

The result is expressed as a mass percentage of element carbon.

The presence of polycarboxylic acid(s) in acid form and/or in carboxylate form may be established by surface infrared or diamond-ATR (Attenuated Total Reflection) Infrared.

The surface infrared analysis (by transmission) is performed on a Brüker Equinox 55 spectrometer on a pellet of pure product. The pellet is obtained after grinding the silica as is in an agate mortar and pelleting at 2 T/cm$^2$ for 10 seconds. The diameter of the pellet is 17 mm. The weight of the pellet is between 10 and 20 mg. The pellet thus obtained is placed in the high vacuum chamber ($10^{-7}$ mbar) of the spectrometer for one hour at room temperature before the analysis by transmission. Acquisition takes place under high vacuum (acquisition conditions: from 400 cm$^{-1}$ to 6000 cm$^{-1}$; number of scans: 100; resolution: 2 cm$^{-1}$).

The diamond-ATR analysis, performed on a Brüker Tensor 27 spectrometer, consists in depositing, on the diamond, a spatula-tip of silica preground in an agate mortar and in then exerting a pressure. The infrared spectrum is recorded on the spectrometer in 20 scans, from 650 cm$^{-1}$ to 4000 cm$^{-1}$. The resolution is 4 cm$^{-1}$.

The centrifugal sedimentation XDC particle size analysis method, via which is measured, firstly, the size distribution widths of silica objects and, secondly, the XDC mode illustrating the size of the objects, is described below:

Materials Required
BI-XDC centrifugal sedimentation particle size analyzer (Brookhaven-Instrument X DISC Centrifuge) sold by the company Brookhaven Instrument Corporation)
high-sided 50 ml beaker
50 ml measuring cylinder
1500 watt Branson ultrasonic probe, without endpiece, 19 mm in diameter
deionized water
crystallizing dish filled with ice
magnetic stirrer Measurement Conditions
Windows version 3.54 of the software (supplied by the particle size analyzer constructor)
fixed mode
spin speed: 5000 rpm;
analysis time: 120 minutes
density (silica): 2.1
volume of suspension to be collected: 15 ml Sample Preparation
Place 3.2 g of silica and 40 ml of deionized water in a high-sided beaker.
Place the beaker containing the suspension in the crystallizing dish filled with ice.
Immerse the ultrasonic probe in the beaker.
Deagglomerate the suspension for 16 minutes using the 1500 watt Branson probe (used in general at 60% of the maximum power).
When the deagglomeration is complete, place the beaker on a magnetic stirrer.
Cool the dispersion obtained to room temperature (21° C.).

Preparation of the Particle Size Analyzer
Switch on the machine and leave it to warm up for at least 30 minutes.
Rinse the disk twice with deionized water.
Enter the measurement conditions mentioned above into the software.

Measurement of the Blank:
Introduce 10 ml of deionized water into the disk, place under rocker agitation and take a measurement of the signal.
Remove the deionized water.

Measurement of the Samples:
Introduce 15 ml of the sample to be analyzed into the disk, place under rocker agitation and take a measurement of the signal.
Take the measurements.

When the measurements have been taken:
Stop the rotation of the disk.
Rinse the disk several times with deionized water.
Switch off the machine.

Results
In the machine register, read the diameter values at 16%, 50% (or median, size for which 50% by mass of the aggregates are smaller than this size) and 84% (mass %) and also the Mode value (the derivative of the cumulative particle size curve gives a frequency curve whose x-axis maximum (x-axis of the main population) is known as the Mode).

The object size distribution width Ld, measured by XDC particle size analysis, after ultrasound deagglomeration (in water), corresponds to the ratio (d84−d16)/d50 in which dn is the size for which n % of particles (by mass) are smaller than this size (the distribution width Ld is thus calculated on the cumulative particle size curve, taken in its entirety).

The size distribution width L'd of objects smaller than 500 nm, measured by XDC particle size analysis, after ultrasound deagglomeration (in water), corresponds to the ratio (d84−d16)/d50 in which dn is the size for which n % of particles (by mass), relative to the particles smaller than 500 nm, are smaller than this size (the distribution width L'd is thus calculated on the cumulative particle size curve, truncated above 500 nm).

The pore volumes and pore diameters are measured by mercury (Hg) porosimetry using a Micromeritics Autopore 9520 porosimeter and are calculated by the Washburn relationship with a contact angle theta equal to 140° and a gamma surface tension equal to 484 dynes/cm (standard DIN 66133). The preparation of each sample is performed as follows: each sample is predried in an oven at 200° C. for 2 hours.

$V_{(d5-d50)}$ represents the pore volume consisting of pores between d5 and d50 in diameter, and $V_{(d5-d100)}$ represents the pore volume consisting of pores between d5 and d100 in diameter, dn being here the pore diameter for which n % of the total surface area of all the pores is provided by the pores with a diameter greater than this diameter (the total surface area of the pores ($S_0$) may be determined from the mercury intrusion curve).

The pore distribution width Idp is obtained from the pore distribution curve, as indicated in FIG. 1, pore volume (ml/g) as a function of the pore diameter (nm): the coordinates of point S corresponding to the main population, i.e. the values of the diameter (nm) $X_s$ and of the pore volume (ml/g) $Y_S$, are read; a straight line of equation $Y=Y_S/2$ is plotted; this straight line crosses the pore distribution curve at two points A and B having the x-axis values (nm) $X_A$ and $X_B$, respectively, on either side of $X_S$; the pore distribution width Idp is equal to the ratio $(X_A-X_B)/X$.

Depending on the source of the starting materials used for the silicate, the precipitated silicas according to the invention may contain additional elements, for instance metals. Among said additional elements, mention may be made of aluminum. The content of aluminum (denoted (Al) is generally less than 1200 ppm, preferably less than 700 ppm, in particular less than 600 ppm and more preferably less than 500 ppm.

The dispersive component of the surface energy $\gamma_s^d$ is determined by inverse gas chromatography. Grinding of the silica is generally necessary when it is in the form of granules, followed by screening, for example at 106 μm-250 μm.

The technique used to calculate the dispersive component of the surface energy $\gamma_s^d$ is Inverse Gas Chromatography at Infinite Dilution (IGC-ID) at 110° C. using a series of alkanes (normal alkanes) ranging from 6 to 10 carbon atoms, a technique based on gas chromatography but where the roles of the mobile phase and of the stationary phase (packing) are reversed. In this instance, the stationary phase in the column is replaced with the (solid) material to be analyzed, in this instance the precipitated silica. With regard to the mobile phase, it consists of the carrier gas (helium) and of the "probe" molecules chosen as a function of their interaction capability. The measurements are successively performed with each probe molecule. For each measurement, each probe molecule is injected into the column, in a very small amount (infinite dilution), as a mixture with methane. The methane is used to determine the t0, the dead time of the column.

Subtracting this dead time t0 from the retention time of the injected probe gives its net retention time ($t_N$).

These operating conditions, specific to infinite dilution, mean that these retention times reflect solely the interactivity of the sample with regard to these molecules. Physically, $t_N$ corresponds to the mean time which the probe molecule has spent in contact with the stationary phase (the solid analyzed). For each probe molecule injected, three net retention times $t_N$ are measured. The mean value and the corresponding standard deviation are used to determine the specific retention volumes ($V_g^0$) on the basis of the following relationship (formula [1]).

$$V_g^0 = \frac{D_c t_N}{M_S} \cdot \frac{273,15}{T} \quad \text{formula [1]}$$

The latter corresponds to the volume of carrier gas (brought back to 0° C.) necessary to elute the probe molecule per 1 gram of stationary phase (solid examined). This standard quantity makes it possible to compare the results, irrespective of the flow rate of carrier gas and the mass of stationary phase used. Formula [1] involves: $M_s$ the mass of solid in the column, $D_c$ the flow rate of carrier gas and T the measurement temperature.

The specific retention volume is subsequently used to access $\Delta G_a$, the variation in free enthalpy of adsorption of the probe, according to the formula [2], with R the universal ideal gas constant (R=8.314 J·K$^{-1}$·mol$^{-1}$), on the solid present in the column.

$$\Delta G_a = RT \cdot \text{Ln}(V_g^0) \quad \text{formula [2]}$$

This quantity $\Delta G_a$ is the starting point for the determination of the dispersive component of the surface energy ($\gamma_s^d$). The latter is obtained by plotting the straight line representing the variation in free enthalpy of adsorption ($\Delta G_a$) as a function of the carbon number $n_c$ of the n-alkane probes, as shown in the Table below.

| n-Alkane probes | $n_c$ |
|---|---|
| n-hexane | 6 |
| n-heptane | 7 |
| n-octane | 8 |
| n-nonane | 9 |
| n-decane | 10 |

It is then possible to determine the dispersive component of the surface energy $\gamma_s^d$ from the slope $\Delta Ga(CH2)$ of the straight line of the normal alkanes, corresponding to the free enthalpy of adsorption of the methylene group, obtained for a measurement temperature of 110° C.

The dispersive component of the surface energy $\gamma_s^d$ is then related to the free enthalpy of adsorption $\Delta G_a^{CH2}$ of the methylene group (Dorris-Gray method, *J. Colloid Interface Sci.*, 77 (180), 353-362) by the following relationship:

$$\gamma_S^d = \frac{(\Delta G_a^{CH2})^2}{4N_A^2 \cdot a_{CH_2}^2 \cdot \gamma_{CH_2}}$$

in which $N_A$ is Avogadro's number (6.02×10$^{23}$ mol$^{-1}$), $a_{CH_2}$ is the area occupied by an adsorbed methylene group (0.06 nm$^2$) and $\gamma_{CH_2}$ is the surface energy of a solid consisting solely of methylene group and determined on polyethylene (35.6 mJ/m$^2$ at 20° C.).

The technique used to measure the water uptake consists generally in placing the predried silica sample under given relative humidity conditions for a predetermined time; the silica then hydrates, which causes the mass of the sample to change from an initial value m (in the dried state) to a final value m+dm. The term "water uptake" of a silica specifically denotes, in particular throughout the rest of the account, the dm/m ratio (i.e. the mass of water incorporated in the sample relative to the mass of the sample in the dry state), expressed as a percentage, calculated for a silica sample subjected to the following conditions during the measurement method:
preliminary drying: 8 hours, at 150° C.,
hydration: 24 hours, at 20° C., and under a relative humidity of 70%.

The experimental protocol used consists in successively:
precisely weighing approximately 2 grams of the silica to be tested;
drying, for 8 hours, the silica thus weighed out in an oven adjusted to a temperature of 105° C.,
determining the mass m of the silica obtained after this drying operation;
placing, for 24 hours, at 20° C., the dried silica in a closed container, such as a desiccator, comprising a water/glycerol mixture, so that the relative humidity of the closed medium is 70%;
determining the mass (m+dm) of the silica obtained subsequent to this treatment at 70% relative humidity for 24 hours, the measurement of this mass being performed immediately after having removed the silica from the desiccator, so as to avoid any variation in the mass of the silica under the influence of the change in hygrometry between the medium at 70% relative humidity and the atmosphere of the laboratory.

The ability of the silicas to disperse and to deagglomerate can be quantified by means of the specific deagglomeration test below.

The cohesion of the agglomerates is assessed by a particle size measurement (by laser diffraction) performed on a suspension of silica deagglomerated beforehand by ultrasonication, the ability of the silica to deagglomerate (cleavage of objects from 0.1 to a few tens of microns) is thus measured. Ultrasound deagglomeration is performed using a Vibracell Bioblock sonicator (600 W), used at 80% of the maximum power, equipped with a probe 19 mm in diameter. The particle size measurement is performed by laser diffraction on a Malvern particle size analyzer (Mastersizer 2000) employing the Fraunhofer theory.

1 gram (±0.1 gram) of silica are introduced into a 50 ml beaker (height: 7.5 cm and diameter: 4.5 cm) and the weight is made up to 50 grams by addition of 49 grams (±0.1 gram) of deionized water. A 2% aqueous silica suspension is thus obtained.

Ultrasound deagglomeration is then performed for 7 minutes.

The particle size measurement is then performed by introducing all of the homogenized suspension into the particle size analyzer chamber.

The median diameter $\varnothing_{50M}$ (or median Malvern diameter), after ultrasound deagglomeration, is such that 50% by volume of the particles have a size of less than $\varnothing_{50M}$ and 50% have a size of greater than $\varnothing_{50M}$. The median diameter value $\varnothing_{50M}$ which is obtained is proportionately smaller the higher the ability of the silica to deagglomerate.

It is also possible to determine in the same manner the Malvern deagglomeration factor $F_{DM}$ by means of a particle size measurement (by laser diffraction) on a suspension of silica deagglomerated beforehand by ultrasonication, the ability of the silica to deagglomerate (cleavage of objects from 0.1 to a few tens of microns) is thus measured. Ultrasound deagglomeration is performed using a Vibracell Bioblock sonicator (600 W), used at 80% of the maximum power, equipped with a probe 19 mm in diameter. The particle size measurement is performed by laser diffraction on a Malvern particle size analyzer (Mastersizer 2000) employing the Fraunhofer theory.

1 gram (±0.1 gram) of silica is introduced into a 50 ml beaker (height: 7.5 cm and diameter: 4.5 cm) and the weight is made up to 50 grams by addition of 49 grams (±0.1 gram) of deionized water. A 2% aqueous silica suspension is thus obtained.

Ultrasound deagglomeration is then performed for 7 minutes.

The particle size measurement is then performed by introducing all of the homogenized suspension into the particle size analyzer chamber.

This deagglomeration factor is determined by the ratio (10×value of the blue laser obscuration/value of the red laser obscuration), this optical density corresponding to the real value detected by the particle size analyzer during the introduction of the silica.

This ratio (Malvern deagglomeration factor $F_{DM}$) is indicative of the content of particles with a size of less than 0.1 μm which are not detected by the particle size analyzer. This ratio increases in proportion as the ability of the silica to deagglomerate increases.

The pH is measured according to the following method deriving from standard ISO 787/9 (pH of a 5% suspension in water):

Equipment:
calibrated pH meter (reading accurate to $\frac{1}{100}^{th}$)
combined glass electrode
200 ml beaker
100 ml measuring cylinder
balance accurate to within 0.01 g.

Procedure:
5 grams of silica are weighed out to within 0.01 gram in the 200 ml beaker. 95 ml of water, measured using the graduated measuring cylinder, are then added to the silica powder. The suspension thus obtained is vigorously stirred (magnetic stirring) for 10 minutes. The pH measurement is then performed.

According to a first variant of the invention, the precipitated silica according to the invention is characterized in that it has:
  a BET specific surface area of between 45 and 550 m²/g, especially between 70 and 370 m²/g, in particular between 80 and 350 m²/g,
  a CTAB specific surface area of between 40 and 525 m²/g, especially between 70 and 350 m²/g, in particular between 80 and 310 m²/g,
  a content (C) of polycarboxylic acid+corresponding carboxylate, expressed as total carbon, of at least 0.15% by weight, in particular of at least 0.20% by weight,
  an object size distribution width Ld ((d84−d16)/d50), measured by XDC particle size analysis after ultrasound deagglomeration, of at least 0.91, in particular of at least 0.94, and
  a pore volume distribution such that the ratio $V_{(d5-d50)}/V_{(d5-d100)}$ is at least 0.65, especially at least 0.66, in particular at least 0.68.

The silica according to this variant of the invention has, for example:
  an object size distribution width Ld ((d84−d16)/d50), measured by XDC particle size analysis after ultrasound deagglomeration, of at least 1.04, and
  a pore volume distribution such that the ratio $V_{(d5-d50)}/V_{(d5-d100)}$ is at least 0.70, especially at least 0.71.

This silica may have a ratio $V_{(d5-d50)}/V_{(d5-d100)}$ of at least 0.73, in particular of at least 0.74. This ratio may be at least 0.78, especially at least 0.80 or even at least 0.84.

According to a second variant of the invention, the precipitated silica according to the invention is characterized in that it has:
  a BET specific surface area of between 45 and 550 m²/g, especially between 70 and 370 m²/g, in particular between 80 and 350 m²/g,
  a CTAB specific surface area of between 40 and 525 m²/g, especially between 70 and 350 m²/g, in particular between 80 and 310 m²/g,
  a content (C) of polycarboxylic acid+corresponding carboxylate, expressed as total carbon, of at least 0.15% by weight, especially of at least 0.20% by weight,
  a pore distribution width Idp of greater than 0.65, especially greater than 0.70, in particular greater than 0.80.

This silica may have a pore distribution width Idp of greater than 1.05, for example 1.25, or even 1.40.

The silica according to this variant of the invention preferably has an object size distribution width Ld ((d84−d16)/d50), measured by XDC particle size analysis after ultrasound deagglomeration, of at least 0.91, in particular at least 0.94, for example at least 1.0.

The precipitated silicas according to the invention (i.e. in accordance with one of the two variants of the invention) may in particular have a BET specific surface area of between 100 and 320 m²/g, in particular between 120 and 300 m²/g, for example between 130 and 280 m²/g.

The precipitated silicas according to the invention may in particular have a CTAB specific surface area of between 100 and 300 m²/g, in particular between 120 and 280 m²/g, for example between 130 and 260 m²/g.

In general, the precipitated silicas according to the invention have a BET specific surface area/CTAB specific surface area ratio of between 0.9 and 1.2, i.e. they have low microporosity.

The precipitated silicas according to the invention may especially have a content (C) of polycarboxylic acid+corresponding carboxylate, expressed as total carbon, of at least 0.24% by weight, in particular of at least 0.30% by weight, for example of at least 0.35% by weight, or even of at least 0.45% by weight.

They generally have a content (C) of polycarboxylic acid+carboxylate of not more than 10.00% by weight, in particular of not more than 5.00% by weight.

The presence of the polycarboxylic acids and/or of the carboxylates corresponding to the polycarboxylic acids at the surface of the silicas according to the invention can be illustrated by the presence of shoulders characteristic of the C—O and C=O bonds, visible on the infrared spectra, obtained in particular by surface (transmission) infrared or diamond-ATR infrared (in particular between 1540 and 1590 $cm^{-1}$ and between 1380 and 1420 $cm^{-1}$ for C—O, and between 1700 and 1750 $cm^{-1}$ for C=O).

In general, the precipitated silicas according to the invention have at their surface molecules of the precipitated polycarboxylic acid(s), in particular of the polycarboxylic acids of the abovementioned mixtures, and/or of the carboxylate(s) corresponding to the abovementioned polycarboxylic acid(s), in particular corresponding to the polycarboxylic acids of the abovementioned mixtures.

For example, they may have at their surface:
molecules of adipic acid in acid form and/or in carboxylate form,
and
molecules of glutaric acid in acid form and/or in carboxylate form,
and
molecules of succinic acid in acid form and/or in carboxylate form.

For example, they may have at their surface:
molecules of methylglutaric acid in acid form and/or in carboxylate form,
and
molecules of ethylsuccinic acid in acid form and/or in carboxylate form,
and
molecules of adipic acid in acid form and/or in carboxylate form.

Preferably, the silicas according to the invention have a dispersive component of the surface energy $\gamma_s^d$ of less than 52 $mJ/m^2$, especially less than 50 $mJ/m^2$, in particular not more than 45 $mJ/m^2$, for example less than 40 $mJ/m^2$, or even less than 35 $mJ/m^2$.

Preferably, the silicas according to the invention have a size distribution width L'd ((d84−d16)/d50) of objects less than 500 nm, measured by XDC particle size analysis after ultrasound deagglomeration, of at least 0.95.

In the silicas according to the invention, the pore volume provided by the largest pores usually represents the largest part of the structure.

They may have both an object size distribution width Ld of at least 1.04 and an object (less than 500 nm) size distribution width L'd of at least 0.95.

The object size distribution width Ld of the silicas according to the invention may in certain cases be at least 1.10, in particular at least 1.20; it may be at least 1.30, for example at least 1.50, or even at least 1.60.

Similarly, the object (less than 500 nm) size distribution width L'd of the silicas according to the invention may be, for example, at least 1.0, in particular at least 1.10, especially at least 1.20.

The precipitated silicas according to the invention may have a water uptake of greater than 6%, in particular of greater than 7%, especially of greater than 7.5%, for example of greater than 8%, or even of greater than 8.5%.

In general, the precipitated silicas according to the invention have a high ability to disperse (in particular in elastomers) and to deagglomerate.

The precipitated silicas according to the invention may have a median diameter $Ø_{50M}$, after ultrasound deagglomeration, of not more than 10.0 µm, preferably not more than 9.0 µm, especially between 3.5 and 8.5 µm.

The precipitated silicas according to the invention may have an ultrasound deagglomeration factor $F_{DM}$ of greater than 5.5 ml, in particular greater than 7.5 ml, for example greater than 12.0 ml.

The precipitated silicas according to the invention preferably have a pH of between 3.5 and 7.5, even more preferably between 4.0 and 7.0, in particular between 4.5 and 6.5.

The precipitated silicas according to the invention may be in any physical state, i.e. they may be in the form of substantially spherical beads (microbeads), a powder or granules.

They may thus be in the form of substantially spherical beads with a mean size of at least 80 µm, preferably at least 150 µm, in particular between 150 and 270 µm; this mean size is determined according to standard NF X 11507 (December 1970) by dry screening and determination of the diameter corresponding to a cumulative oversize of 50%.

They may also be in the form of a powder with a mean size of at least 15 µm, in particular at least 20 µm, preferably at least 30 µm.

They may be in the form of granules (generally of substantially parallelepipedal shape) with a size of at least 1 mm, for example between 1 and 10 mm, especially along the axis of their largest dimension.

The silicas according to the invention are preferably obtained via the process described previously.

Advantageously, the precipitated silicas according to the present invention or (that may be) obtained by the process according to the invention described previously confer, on the polymeric (elastomeric) compositions into which they are introduced, a highly satisfactory compromise of properties, in particular a reduction in their viscosity and preferably an improvement in their dynamic properties, while retaining their mechanical properties. Thus, they advantageously allow an improvement in the processing/reinforcement/hysteresis properties compromise. Preferably, they have a good ability to disperse and to deagglomerate in polymeric (elastomeric) compositions.

The precipitated silicas according to the present invention or (capable of being) obtained by the process described previously according to the invention may be used in numerous applications.

They may be employed, for example, as catalyst support, as absorbent for active materials (in particular support for liquids, especially used in food, such as vitamins (vitamin E) or choline chloride), in polymer, especially elastomer, or silicone compositions, as viscosity-increasing, texturizing or anticaking agent, as battery separator component, or as additive for toothpaste, concrete or paper.

However, they find a particularly advantageous application in the reinforcement of natural or synthetic polymers.

The polymer compositions in which they may be employed, in particular as reinforcing filler, are generally based on one or more polymers or copolymers (especially bipolymers or terpolymers), in particular on one or more elastomers, preferably having at least one glass transition temperature of between −150° C. and +300° C., for example between −150° C. and +20° C.

Mention may in particular be made, as possible polymers, of diene polymers, in particular diene elastomers.

For example, use may be made of polymers or copolymers (in particular bipolymers or terpolymers) deriving from aliphatic or aromatic monomers, comprising at least one unsaturation (such as, in particular, ethylene, propylene, butadiene, isoprene, styrene, acrylonitrile, isobutylene or vinyl acetate), polybutyl acrylate, or mixtures thereof; mention may also be made of silicone elastomers, functionalized elastomers, for example functionalized with chemical groups positioned throughout the macromolecular chain and/or at one or more of its ends (for example with functions capable of reacting with the surface of the silica), and halogenated polymers. Mention may be made of polyamides and fluorinated polymers (such as polyvinylidene fluoride).

Mention may also be made of thermoplastic polymers such as polyethylene.

The polymer (copolymer) may be a bulk polymer (copolymer), a polymer (copolymer) latex or else a solution of polymer (copolymer) in water or in any other suitable dispersing liquid.

Mention may be made, as diene elastomers, for example, of polybutadienes (BRs), polyisoprenes (IRs), butadiene copolymers, isoprene copolymers, or mixtures thereof, and in particular styrene/butadiene copolymers (SBRs, in particular ESBRs (emulsion) or SSBRs (solution)), isoprene/butadiene copolymers (BIRs), isoprene/styrene copolymers (SIRs), isoprene/butadiene/styrene copolymers (SBIRs), ethylene/propylene/diene terpolymers (EPDMs), and also the associated functionalized polymers (for example bearing polar groups included in the chain, pendent or at the chain end, which can interact with the silica).

Mention may also be made of natural rubber (NR) and epoxidized natural rubber (ENR).

The polymer compositions may be vulcanized with sulfur (vulcanizates are then obtained) or crosslinked, in particular with peroxides or other crosslinking systems (for example diamines or phenolic resins).

In general, the polymer compositions also comprise at least one (silica/polymer) coupling agent and/or at least one covering agent; they may also comprise, inter alia, an antioxidant.

Nonlimiting examples of coupling agents that may especially be used include "symmetrical" or "unsymmetrical" silane polysulfides, mention may more particularly be made of bis(($C_1$-$C_4$)alkoxyl($C_1$-$C_4$)alkylsilyl($C_1$-$C_4$)alkyl) polysulfides (in particular disulfides, trisulfides or tetrasulfides), for instance bis(3-(trimethoxysilyl)propyl) polysulfides or bis(3-(triethoxysilyl)propyl) polysulfides, such as triethoxysilylpropyl tetrasulfide. Mention may also be made of monoethoxydimethylsilylpropyl tetrasulfide. Mention may also be made of silanes bearing masked or free thiol functions, or bearing amine functions.

The coupling agent may be grafted beforehand onto the polymer.

It may also be used in the free state (i.e. not grafted beforehand) or grafted to the surface of the silica. This is likewise the case for the optional covering agent.

The coupling agent may optionally be combined with a suitable "coupling activator", i.e. a compound which, when mixed with this coupling agent, increases the efficacy of the latter.

The weight proportion of silica in the polymer composition may vary within a fairly wide range. It usually represents from 0.1 to 3.0 times by weight, in particular 0.1 to 2.0 times by weight, especially 0.2 to 1.5 times by weight, for example 0.2 to 1.2 times by weight, or even 0.3 to 0.8 times by weight of the amount of the polymer(s).

The silica according to the invention may advantageously constitute all of the reinforcing mineral filler and even all of the reinforcing filler of the polymer composition.

However, this silica according to the invention may optionally be combined with at least one other reinforcing filler, such as, in particular, a commercial highly dispersible silica, for instance Z1165MP or Z1115MP, a treated precipitated silica (for example, a precipitated silica "doped" with a cation such as aluminum, or treated with a coupling agent such as a silane), another reinforcing mineral filler, for instance alumina, or even a reinforcing organic filler, especially carbon black (optionally covered with a mineral layer, for example of silica). The silica according to the invention then preferably constitutes at least 50% by weight, or even at least 80% by weight, of all of the reinforcing filler.

Mention may be made, as nonlimiting examples of finished articles comprising at least one of (in particular based on) said polymer compositions described previously (especially based on the abovementioned vulcanizates), of footwear soles (preferably in the presence of a (silica/polymer) coupling agent, for example triethoxysilylpropyl tetrasulfide), floor coverings, gas barriers, flame-retardant materials and also engineering components, such as rollers for cableways, seals for domestic electrical appliances, seals for liquid or gas pipes, braking system seals, pipes (flexible), sheathings (in particular cable sheathings), cables, engine supports, battery separators, conveyor belts, transmission belts or, preferably, tires, in particular tire treads (especially for light vehicles or for heavy-goods vehicles (for example trucks)).

The examples that follow illustrate the invention without, however, limiting the scope thereof.

EXAMPLES

Example 1

700 liters of industrial water are introduced into a 2000 liter reactor. This solution is brought to 80° C. by heating by direct injection of steam. With stirring (95 rpm), sulfuric acid, with a concentration equal to 80 g/l, is introduced until the pH reaches a value of 4.

A sodium silicate solution (with an $SiO_2/Na_2O$ weight ratio equal to 3.52) having a concentration of 230 g/l is introduced into the reactor over 35 minutes, at a flow rate of 190 l/h, simultaneously with sulfuric acid, with a concentration equal to 80 g/l, at a flow rate regulated so as to maintain the pH of the reaction medium at a value of 4.

After the 35 minutes of simultaneous addition, the introduction of acid is stopped as long as the pH has not reached a value equal to 8. A further simultaneous addition is then performed over 40 minutes with a sodium silicate flow rate of 190 l/h (same sodium silicate as for the first simultaneous addition) and a flow rate of sulfuric acid, with a concentration equal to 80 g/l, regulated so as to maintain the pH of the reaction medium at a value of 8.

After this simultaneous addition, the reaction medium is brought to a pH of 5.2 with sulfuric acid with a concentration equal to 80 g/l. The medium is matured for 5 minutes at pH 5.2.

The slurry is filtered and washed on a filter press, to give a precipitated silica cake with a solids content of 22%.

Example 2

Part of the silica cake obtained in Example 1 is then subjected to a liquefaction operation.

During the liquefaction operation, a solution of an MGA mixture at 34% by mass (mixture of polycarboxylic acids: 94.8% by weight of methylglutaric acid, 4.9% by weight of ethylsuccinic anhydride, 0.2% by weight of adipic acid, 0.1% others) is used.

The cake obtained in the filtration step is subjected to a liquefaction operation in a continuous vigorously stirred reactor with addition to the cake of 36.8 grams of the MGA solution (MGA mixture/$SiO_2$ weight ratio of 1%).

This liquefacted cake (with a solids content of 22% by weight) is subsequently dried using a two-fluid nozzle atomizer by spraying the liquefacted cake through a 2.54 mm SU5 nozzle (Spraying System) with a pressure of 1 bar under the following mean conditions of flow rate and of temperatures:

Mean inlet temperature: 250° C.
Mean outlet temperature: 135° C.
Mean flow rate: 15 l/h.

The characteristics of silica S1 obtained (in the form of substantially spherical beads) are then the following:

| | |
|---|---|
| BET ($m^2/g$) | 217 |
| Content of polycarboxylic acid + carboxylate (C) (%) | 0.42 |
| Aluminum (Al) content (%) | 0.08 |
| CTAB ($m^2/g$) | 214 |
| $\gamma_s^d$ ($mJ/m^2$) | 42.8 |
| Width Ld (XDC) | 1.02 |
| $V_{(d5-d50)}/V_{(d5-d100)}$ | 0.71 |
| Pore distribution width ldp | 1.07 |
| Width L'd (XDC) | 0.95 |
| Water uptake (%) | 8.4 |
| $Ø_{50M}$ (μm) after ultrasound deagglomeration | 4.1 |
| $F_{DM}$ after ultrasound deagglomeration | 16.1 |
| pH | 3.96 |

Example 3 (Comparative)

Part of the silica cake obtained in Example 1 is then subjected to a liquefaction operation.

The cake obtained in the filtration step is subjected to a liquefaction operation in a continuous vigorously stirred reactor with simultaneous addition to the cake of 27.8 grams of a sodium aluminate solution (Al/$SiO_2$ weight ratio of 0.3%) and 29.8 grams of a sulfuric acid solution at 7.7% by mass.

This liquefacted cake (with a solids content of 22% by weight) is subsequently dried using a two-fluid nozzle atomizer by spraying the liquefacted cake through a 2.54 mm SU5 nozzle (Spraying System) with a pressure of 1 bar under the following mean conditions of flow rate and of temperatures:

Mean inlet temperature: 250° C.
Mean outlet temperature: 135° C.
Mean flow rate: 15 l/h.

The characteristics of silica C1 obtained (in the form of substantially spherical beads) are then the following:

| | |
|---|---|
| BET ($m^2/g$) | 221 |
| Content of polycarboxylic acid + carboxylate (C) (%) | — |
| Aluminum (Al) content (%) | 0.4 |
| CTAB ($m^2/g$) | 206 |
| $\gamma_s^d$ ($mJ/m^2$) | 59.6 |
| Width Ld (XDC) | 1.08 |
| $V_{(d5-d50)}/V_{(d5-d100)}$ | 0.69 |
| Pore distribution width ldp | 1.06 |
| Width L'd (XDC) | 0.97 |
| Water uptake (%) | 8.9 |
| $Ø_{50M}$ (μm) after ultrasound deagglomeration | 6.2 |
| $F_{DM}$ after ultrasound deagglomeration | 15.3 |
| pH | 6.47 |

Example 4

The elastomeric compositions, the make up of which, expressed as parts by weight per 100 parts of elastomers (phr), is shown in Table I below, are prepared in an internal mixer of Brabender type (380 ml):

TABLE I

| Composition | Control 1 | Composition 1 |
|---|---|---|
| SBR (1) | 70 | 70 |
| BR (1) | 30 | 30 |
| Silica C1 (2) | 75 | |
| Silica S1 (3) | | 75 |
| Coupling agent (4) | 6.6 | 6.6 |
| Plasticizer (5) | 20 | 20 |
| Carbon black (N330) | 5.0 | 5.0 |
| ZnO | 2.5 | 2.5 |
| Stearic acid | 2.0 | 2.0 |
| Antioxidant (6) | 1.9 | 1.9 |
| DPG (7) | 2.0 | 2.0 |
| CBS (8) | 1.7 | 1.7 |
| Sulfur | 1.5 | 1.5 |

(1) S-SBR (HPR355 from the company JSR) functionalized with 57% of vinyl units; 27% of styrene units; Tg in the region of −27° C./BR (Buna CB 25 from the company Lanxess)
(2) Silica C1 (liquefaction with simultaneous addition of sodium aluminate and sulfuric acid (Example 3 - comparative))
(3) Silica S1 according to the present invention (liquefaction with addition of a mixture of MGA acids (Example 2 above))
(4) Bis-triethoxysilylpropyldisulfidosilane (JH-S75 TESPD from the company Castle Chemicals)
(5) Plasticizing oil of TDAE type (Vivatec 500 from the company Hansen & Rosenthal KG)
(6) N-(1,3-dimethylbutyl)-N-phenyl-para-phenylenediamine (Santoflex 6-PPD from the company Flexsys)
(7) Diphenylguanidine (Rhenogran DPG-80 from RheinChemie)
(8) N-cyclohexyl-2-benzothiazolylsulfenamide (Rhenogran CBS-80 from the company RheinChemie)

Process for preparing the elastomeric compositions:

The process for preparing the rubber compositions is performed in two successive preparation phases. A first phase consists of a phase of high-temperature thermomechanical working. It is followed by a second phase of mechanical working at temperatures below 110° C. This phase allows the introduction of the vulcanization system.

The first phase is carried out using a mixing device, of internal mixer type, of Brabender brand (capacity of 380 ml). The filling coefficient is 0.6. The initial temperature and speed of the rotors are set on each occasion so as to achieve mixture dropping temperatures of approximately 115-170° C.

Broken down here into two passes, the first phase makes it possible to incorporate, in a first pass, the elastomers and then the reinforcing filler (portionwise introduction) with the coupling agent and the stearic acid. For this pass, the duration is between 4 and 10 minutes.

After cooling the mixture (temperature of less than 100° C.), a second pass makes it possible to incorporate the zinc oxide and the protecting agents/antioxidants (in particular 6-PPD). The duration of this pass is between 2 and 5 minutes.

After cooling the mixture (temperature of less than 100° C.), the second phase allows the introduction of the vulcanization system (sulfur and accelerators, such as CBS). It is performed on an open mill, preheated to 50° C. The duration of this phase is between 2 and 6 minutes.

Each final mixture is subsequently calendered in the form of plates with a thickness of 2-3 mm.

An evaluation of the rheological properties of these "crude" mixtures obtained makes it possible to optimize the vulcanization time and the vulcanization temperature.

The mechanical and dynamic properties of the mixtures vulcanized at the curing optimum (T98) are then measured.

Rheological Properties

Viscosity of the crude mixtures:

The Mooney consistency is measured on the compositions in the crude state at 100° C. using an MV 2000 rheometer and also the determination of the Mooney stress-relaxation rate according to standard NF ISO 289.

The value of the torque, read at the end of 4 minutes after preheating for one minute (Mooney Large (1+4)—at 100° C.), is shown in Table II. The test is performed after preparing the crude mixtures and then after aging for 3 weeks at a temperature of 23±3° C.

TABLE II

| References | | Control 1 | Composition 1 |
| --- | --- | --- | --- |
| ML (1 + 4) - 100° C. | Initial | 166 | 136 |
| Mooney relaxation | Initial | 0.204 | 0.229 |
| ML (1 + 4) - 100° C. | After 17 days (23 ± 3° C.) | 182 | 154 |
| Mooney relaxation | After 17 days (23 ± 3° C.) | 0.175 | 0.206 |
| ML (1 + 4) - 100° C. | After 21 days (23 ± 3° C.) | 183 | 155 |
| Mooney relaxation | After 21 days (23 ± 3° C.) | 0.183 | 0.201 |

It is found that the silica S1 of the present invention (Composition 1) makes possible a sizeable reduction in the initial raw viscosity, with respect to the value of the mixture with the reference (Control 1).

It is also found that the silica S1 of the present invention (Composition 1) makes it possible to retain the advantage in reduced raw viscosity, with respect to the value of the mixture with the reference (Control 1), after 3 weeks of storage.

This type of behavior over time is of great use to a person skilled in the art in the case of using rubber mixtures containing silica.

Rheometry of the compositions:

The measurements are performed on the compositions in crude form. The results relating to the rheology test, which is performed at 160° C. using a Monsanto ODR rheometer according to the standard NF ISO 3417, are given in Table III.

According to this test, the test composition is placed in the test chamber regulated at the temperature of 160° C. for 30 minutes, and the resistive torque opposed by the composition to a low-amplitude (3°) oscillation of a biconical rotor included in the test chamber is measured, the composition completely filling the chamber under consideration.

The following are determined from the curve of variation in the torque as a function of time:

the minimum torque (Tmin), which reflects the viscosity of the composition at the temperature under consideration;

the maximum torque (Tmax), the delta torque ($\Delta T = Tmax - Tmin$), which reflects the degree of crosslinking brought about by the action of the crosslinking system and, if the need arises, of the coupling agents;

the time T98 necessary to obtain a vulcanization state corresponding to 98% of complete vulcanization (this time is taken as the vulcanization optimum);

and the scorch time TS2, corresponding to the time necessary in order to have a rise of 2 points above the minimum torque at the temperature under consideration (160° C.) and which reflects the time during which it is possible to implement the raw mixtures at this temperature without having initiation of vulcanization (the mixture cures at and above TS2).

The results obtained are shown in Table III.

TABLE III

| Compositions | Control 1 | Composition 1 |
| --- | --- | --- |
| Tmin (dN · m) | 32.6 | 28.1 |
| Tmax (dN · m) | 73.9 | 69.3 |
| Delta torque (dN · m) | 41.3 | 41.2 |
| TS2 (min) | 3.1 | 4.6 |
| T98 (min) | 27.1 | 27.2 |

The use of silica S1 of the present invention (Composition 1) makes it possible to reduce the minimum viscosity (sign of an improvement in the crude viscosity) relative to the control mixture (Control 1) without impairing the vulcanization behavior.

It is also found that the use of silica S1 of the present invention (Composition 1) makes it possible to improve the scorch time TS2 relative to the control mixture (Control 1) without impairing the time T98.

Mechanical Properties of the Vulcanizates:

The measurements are performed on the optimally vulcanized compositions (T98) for a temperature of 160° C.

Uniaxial tensile tests are performed in accordance with the instructions of standard NF ISO 37 with test specimens of H2 type at a rate of 500 mm/min on an Instron 5564 machine. The x % moduli, corresponding to the stress measured at x % of tensile strain, and the ultimate strength are expressed in MPa, the elongation at break is expressed in %. It is possible to determine a reinforcing index (RI) which is equal to the ratio of the modulus at 300% strain to the modulus at 100% strain.

The Shore A hardness measurement of the vulcanizates is performed according to the instructions of standard ASTM D 2240. The given value is measured at 15 seconds.

The properties measured are collated in Table IV.

TABLE IV

| Compositions | Control 1 | Composition 1 |
| --- | --- | --- |
| 10% Modulus (MPa) | 0.91 | 0.93 |
| 100% Modulus (MPa) | 3.1 | 3.1 |
| 300% Modulus (MPa) | 12.2 | 11.9 |
| Ultimate strength (MPa) | 16.1 | 16.7 |
| Elongation at break (%) | 373 | 387 |
| RI | 3.9 | 3.8 |
| Shore A hardness - 15 s (pts) | 73 | 70 |

The use of a silica S1 of the present invention (Composition 1) makes it possible to obtain a satisfactory level of reinforcement, relative to the control mixture (Control 1) and in particular to conserve a high level of the 300% strain modulus.

Dynamic Properties of the Vulcanizates:

The dynamic properties are measured on a viscosity analyzer (Metravib VA3000) according to standard ASTM D5992.

The values for loss factor (tan δ) and compressive dynamic complex modulus (E*) are recorded on vulcanized samples (cylindrical test specimen with a cross section of 95 mm² and a height of 14 mm). The sample is subjected at the start to a 10% prestrain and then to a sinusoidal strain in alternating compression of ±2%. The measurements are performed at 60° C. and at a frequency of 10 Hz.

The results, presented in Table V, are thus the compressive complex modulus (E*, 60° C., 10 Hz) and the loss factor (tan δ, 60° C., 10 Hz).

TABLE V

| Compositions | Control 1 | Composition 1 |
|---|---|---|
| E*, 60° C., 10 Hz (MPa) | 13.6 | 13.3 |
| Tan δ, 60° C., 10 Hz | 0.164 | 0.160 |

The use of a silica S1 of the present invention (Composition 1) makes it possible to maintain the dynamic properties at the level of that of the control mixture (Control 1).

The examination of the various Tables II to V shows that the composition in accordance with the invention (Composition 1) makes it possible to obtain a good processing/reinforcement/hysteresis properties compromise, with respect to the control composition (Control 1), and in particular a sizeable gain in raw viscosity, which remains stable on storage over time.

Example 5

955 liters of industrial water are introduced into a 2500 liter reactor. This solution is brought to 90° C. by heating by direct injection of steam. With stirring (95 rpm), 15 kg of solid sodium sulfate are introduced into the reactor. Sulfuric acid, with a mass concentration of 7.7% and a density of 1050 g/l, is then added until the pH reaches a value of 3.6.

A sodium silicate solution (with an $SiO_2/Na_2O$ weight ratio equal to 3.52 and a density equal to 1.237 kg/l) is introduced into the reactor over 35 minutes, at a flow rate of 190 l/h, simultaneously with sulfuric acid (with a mass concentration equal to 7.7% and a density of 1050 g/l), at a flow rate regulated so as to maintain the pH of the reaction medium at a value of 3.6.

After the 35 minutes of simultaneous addition, the introduction of acid is stopped as long as the pH has not reached a value equal to 8. A further simultaneous addition is then performed over 40 minutes with a sodium silicate flow rate of 190 l/h (same sodium silicate as for the first simultaneous addition) and a flow rate of sulfuric acid (with a mass concentration of 7.7% and a density of 1050 g/l) regulated so as to maintain the pH of the reaction medium at a value of 8.

After this simultaneous addition, the reaction medium is brought to a pH of 5.6 by introduction of sulfuric acid (with a mass concentration of 7.7% and a density of 1050 g/l). 2090 liters of slurry are obtained after this operation.

The slurry is filtered and washed on a filter press, to give a precipitated silica cake with a solids content of 20%.

Example 6

A portion of the silica cake obtained in Example 5 is then subjected to a liquefaction step.

During the liquefaction operation, a solution of an MGA mixture at 34% by mass (mixture of polycarboxylic acids: 94.8% by weight of methylglutaric acid, 4.9% by weight of ethylsuccinic anhydride, 0.2% by weight of adipic acid, 0.1% others) is used.

The cake obtained in the filtration step is subjected to a liquefaction operation in a continuous vigorously stirred reactor with addition to the cake of 15.83 grams of the MGA solution (MGA mixture/$SiO_2$ weight ratio of 1.0%).

This liquefacted cake (with a solids content of 20% by weight) is subsequently dried using a two-fluid nozzle atomizer by spraying the liquefacted cake through a 2.54 mm SU5 nozzle (Spraying System) with a pressure of 1 bar under the following mean conditions of flow rate and of temperatures:

Mean inlet temperature: 250° C.
Mean outlet temperature: 140° C.
Mean flow rate: 8.9 l/h.

The characteristics of the silica S2 obtained (in the form of substantially spherical beads) are then the following:

| | |
|---|---|
| BET (m²/g) | 256 |
| Content of polycarboxylic acid + carboxylate (C) (%) | 0.40 |
| Aluminum (Al) content (%) | 0.06 |
| CTAB (m²/g) | 251 |
| $\gamma_s^d$ (mJ/m²) | 39.0 |
| Width Ld (XDC) | 1.15 |
| $V_{(d5-d50)}/V_{(d5-d100)}$ | 0.70 |
| Pore distribution width ldp | 0.88 |
| Width L'd (XDC) | 1.12 |
| Water uptake (%) | 8.45 |
| $\varnothing_{50M}$ (µm) after ultrasound deagglomeration | 4.8 |
| $F_{DM}$ after ultrasound deagglomeration | 13.3 |
| pH | 4.2 |

Example 7 (Comparative)

Part of the silica cake obtained in Example 5 is then subjected to a liquefaction step.

The cake obtained in the filtration step is subjected to a liquefaction operation in a continuous vigorously stirred reactor with simultaneous addition to the cake of 15.32 grams of a sodium aluminate solution (Al/$SiO_2$ weight ratio of 0.3%) and 37.9 grams of a sulfuric acid solution at 7.7% by mass.

This liquefacted cake (with a solids content of 20% by weight) is subsequently dried using a two-fluid nozzle atomizer by spraying the liquefacted cake through a 2.54 mm SU5 nozzle (Spraying System) with a pressure of 1 bar under the following mean conditions of flow rate and of temperatures:

Mean inlet temperature: 250° C.
Mean outlet temperature: 140° C.
Mean flow rate: 9.8 l/h.

The characteristics of silica C2 obtained (in the form of substantially spherical beads) are then the following:

| | |
|---|---|
| BET (m²/g) | 254 |
| Content of polycarboxylic acid + carboxylate (C) (%) | — |
| Aluminum (Al) content (%) | 0.42 |
| Ratio (R) | 0.0 |
| CTAB (m²/g) | 250 |
| $\gamma_s^d$ (mJ/m²) | 65.9 |
| Width Ld (XDC) | 1.23 |
| $V_{(d5-d50)}/V_{(d5-d100)}$ | 0.68 |
| Pore distribution width ldp | 0.70 |
| Width L'd (XDC) | 1.08 |

-continued

| | |
|---|---|
| Water uptake (%) | 9.3 |
| $\varnothing_{50M}$ (μm) after ultrasound deagglomeration | 6.7 |
| $F_{DM}$ after ultrasound deagglomeration | 14.4 |
| pH | 6.2 |

Example 8

The elastomeric compositions, the make up of which, expressed as parts by weight per 100 parts of elastomers (phr), is shown in Table VI below, are prepared in an internal mixer of Brabender type (380 ml):

TABLE VI

| Composition | Control 2 | Composition 2 |
|---|---|---|
| SBR (1) | 103 | 103 |
| BR (1) | 25 | 25 |
| Silica C2 (2) | 80 | |
| Silica S2 (3) | | 80 |
| Coupling agent (4) | 10 | 10 |
| Plasticizer (5) | 12 | 12 |
| Carbon black (N234) | 3 | 3 |
| ZnO | 2.5 | 2.5 |
| Stearic acid | 2 | 2 |
| Antioxidant (6) | 1.2 | 1.2 |
| DPG (7) | 2.5 | 2.5 |
| CBS (8) | 2.3 | 2.3 |
| Sulfur | 1.6 | 1.6 |

(1) Solution SBR (Buna VSL4526-2 from the company Lanxess) with 44.5 ± 4% of vinyl units; 26 ± 2% of styrene units; Tg in the region of −30° C., 100 phr of SBR extended with 37.5 ± 2.8% by weight of oil/BR (Buna CB 25 from the company Lanxess)
(2) Silica C2 (liquefaction with simultaneous addition of sodium aluminate and sulfuric acid (Example 7 - comparative))
(3) Silica S2 according to the present invention (liquefaction with simultaneous addition of sodium aluminate and of a mixture of MGA acids (Example 6 above))
(4) Bis-triethoxysilylpropyldisulfidosilane (HP 1589 TESPD from the company HungPai)
(5) Plasticizing oil of TDAE type (Vivatec 500 from the company Hansen & Rosenthal KG)
(6) N-(1,3-dimethylbutyl)-N-phenyl-para-phenylenediamine (Santoflex 6-PPD from the company Flexsys)
(7) Diphenylguanidine (Rhenogran DPG-80 from RheinChemie)
(8) N-cyclohexyl-2-benzothiazolesulfenamide (Rhenogran CBS-80 from the company RheinChemie)

Process for Preparing the Elastomeric Compositions:

The process for preparing the rubber compositions is performed in two successive preparation phases according to the same procedure as that for Example 4.

An evaluation of the rheological properties of these "crude" mixtures obtained makes it possible to optimize the vulcanization time and the vulcanization temperature.

The mechanical and dynamic properties of the mixtures vulcanized at the curing optimum (T98) are then measured.

Rheological Properties

Viscosity of the crude mixtures:

The Mooney consistency is measured on the compositions in the crude state at 100° C. using an MV 2000 rheometer and also the determination of the Mooney stress-relaxation rate according to standard NF ISO 289.

The value of the torque, read at the end of 4 minutes after preheating for one minute (Mooney Large (1+4)—at 100° C.), is shown in Table VII. The test is performed after preparing the crude mixtures and then after aging for 2 weeks, and then 28 days, at a temperature of 23±3° C.

TABLE VII

| References | | Control 2 | Composition 2 |
|---|---|---|---|
| ML (1 + 4) - 100° C. | Initial | 129 | 100 |
| Mooney relaxation | Initial | 0.176 | 0.228 |
| ML (1 + 4) - 100° C. | After 14 days (23 ± 3° C.) | 144 | 122 |
| Mooney relaxation | After 14 days (23 ± 3° C.) | 0.155 | 0.198 |
| ML (1 + 4) - 100° C. | After 28 days (23 ± 3° C.) | 151 | 130 |
| Mooney relaxation | After 28 days (23 ± 3° C.) | 0.145 | 0.178 |

It is found that the silica S2 of the present invention (Composition 2) allows a substantial reduction in the initial crude viscosity, relative to the value of the mixture with the reference (Control 2).

It is also found that the silica S2 of the present invention (Composition 2) makes it possible to retain the advantage in reduced crude viscosity, relative to the value of the mixture with the reference (Control 2), after 28 days of storage.

This type of behavior over time is of great use to a person skilled in the art in the case of using rubber mixtures containing silica.

Rheometry of the compositions:

The measurements are performed on the compositions in crude form. The results relating to the rheology test, which is performed at 160° C. using a Monsanto ODR rheometer according to standard NF ISO 3417 and as described in Example 4, are given in Table VIII.

The results obtained are shown in Table VIII.

TABLE VIII

| Compositions | Control 2 | Composition 2 |
|---|---|---|
| Tmin (dN · m) | 36.3 | 27.7 |
| Tmax (dN · m) | 76.5 | 71.1 |
| Delta torque (dN · m) | 40.1 | 43.4 |
| TS2 (min) | 3.2 | 5.5 |
| T98 (min) | 27.0 | 26.0 |

The use of silica S2 of the present invention (Composition 2) makes it possible to reduce the minimum viscosity (sign of an improvement in the crude viscosity) relative to the control mixture (Control 2) without impairing the vulcanization behavior.

It is also found that the use of silica S2 of the present invention (Composition 2) makes it possible to improve the scorch time TS2 relative to the control mixture (Control 2) without impairing the time T98.

Mechanical Properties of the Vulcanizates:

The measurements are performed on the optimally vulcanized compositions (T98) for a temperature of 160° C.

Uniaxial tensile tests are performed in accordance with the instructions of standard NF ISO 37 with test specimens of H2 type at a rate of 500 mm/min on an Instron 5564 machine. The x % moduli, corresponding to the stress measured at x % of tensile strain, and the ultimate strength are expressed in MPa, the elongation at break is expressed in %. It is possible to determine a reinforcing index (RI) which is equal to the ratio of the modulus at 300% strain to the modulus at 100% strain.

The Shore A hardness measurement of the vulcanizates is performed according to the instructions of standard ASTM D 2240. The given value is measured at 15 seconds.

The properties measured are collated in Table IX.

TABLE IX

| Compositions | Control 2 | Composition 2 |
|---|---|---|
| 10% Modulus (MPa) | 0.9 | 0.8 |
| 100% Modulus (MPa) | 2.6 | 2.4 |
| 300% Modulus (MPa) | 9.9 | 9.7 |
| Ultimate strength (MPa) | 16.9 | 18.5 |
| Elongation at break (%) | 450 | 479 |
| RI | 3.8 | 4.0 |
| Shore A hardness - 15 s (pts) | 72 | 70 |

The use of silica S2 of the present invention (Composition 2) makes it possible to obtain a satisfactory level of reinforcement, relative to the control mixture (Control 2) and in particular to retain a high level of the 300% strain modulus and of ultimate properties (tensile strength and elongation).

Composition 2 thus have relatively low 10% and 100% moduli and a relatively high 300% modulus, hence a good reinforcing index.

Dynamic Properties of the Vulcanizates:

The dynamic properties are measured on a viscosity analyzer (Metravib VA3000) according to standard ASTM D5992.

The values for the loss factor (tan δ) and the dynamic shear elastic modulus ($G^*_{12\%}$) are recorded on vulcanized samples (parallelepipedal test specimen with a cross section of 8 mm$^2$ and a height of 7 mm). The sample is subjected to a double alternating sinusoidal shear strain at a temperature of 40° C. and at a frequency of 10 Hz. The strain amplitude sweeping processes are performed according to an outward-return cycle, proceeding outward from 0.1% to 50% and then returning from 50% to 0.1%.

The results, presented in Table X, result from the return strain amplitude sweep and relate to the maximum value of the loss factor (tan δ max return, 40° C., 10 Hz) and also the elastic modulus $G^*_{12\%}$.

TABLE X

| Compositions | Control 2 | Composition 2 |
|---|---|---|
| $G^*_{12\%}$, 40° C., 10 Hz (MPa) | 2.0 | 1.8 |
| Tan δmax return, 40° C., 10 Hz | 0.282 | 0.286 |

The use of silica S2 of the present invention (Composition 2) makes it possible to maintain the dynamic properties at the level of that of the control mixture (Control 2).

Examination of the various Tables VII to X shows that the composition in accordance with the invention (Composition 2) makes it possible to improve the processing/reinforcement/hysteresis properties at 40° C. compromise, relative to the control composition (Control 2), and in particular to achieve a substantial gain in crude viscosity, which remains stable on storage over time.

The invention claimed is:

1. A process for preparing a precipitated silica, the process comprising:
    precipitating a silicate and an acidifying agent by:
        (i) forming an aqueous feedstock with a pH of between 2.0 and 5.0,
        (ii) simultaneously adding silicate and acidifying agent to said feedstock, such that the pH of the reaction medium is maintained between 2.0 and 5.0,
        (iii) discontinuing the addition of the acidifying agent while continuing the addition of the silicate to the reaction medium until a pH value of the reaction medium of between 7.0 and 10.0 is obtained,
        (iv) simultaneously adding silicate and acidifying agent to the reaction medium, such that the pH of the reaction medium is maintained between 7.0 and 10.0,
        (v) discontinuing the addition of the silicate while continuing the addition of the acidifying agent to the reaction medium until a pH value of the reaction medium of less than 6.0 is obtained, thus providing a silica suspension,
    filtering the silica suspension to form a filter cake,
    subjecting the filter cake to a liquefaction operation,
    wherein a mixture of polycarboxylic acids comprising adipic acid, glutaric acid and succinic acid is added to the filter cake, either during the liquefaction operation, or after the liquefaction operation and before a drying step.

2. The process as claimed in claim 1, wherein the mixture of polycarboxylic acids comprises 15.00% to 35.00% by weight of adipic acid, 40.00% to 60.00% by weight of glutaric acid and 15.00% to 25.00% by weight of succinic acid.

3. A process for preparing a precipitated silica, the process comprising:
    precipitating a silicate and an acidifying agent by:
        (i) forming an aqueous feedstock with a pH of between 2.0 and 5.0,
        (ii) simultaneously adding silicate and acidifying agent to said feedstock, such that the pH of the reaction medium is maintained between 2.0 and 5.0,
        (iii) discontinuing the addition of the acidifying agent while continuing the addition of the silicate to the reaction medium until a pH value of the reaction medium of between 7.0 and 10.0 is obtained,
        (iv) simultaneously adding silicate and acidifying agent to the reaction medium, such that the pH of the reaction medium is maintained between 7.0 and 10.0,
        (v) discontinuing the addition of the silicate while continuing the addition of the acidifying agent to the reaction medium until a pH value of the reaction medium of less than 6.0 is obtained, thus providing a silica suspension,
    filtering the silica suspension to form a filter cake,
    subjecting the filter cake to a liquefaction operation,
    wherein a mixture of polycarboxylic acids comprising methylglutaric acid, ethylsuccinic acid and adipic acid is added to the filter cake, either during the liquefaction operation, or after the liquefaction operation and before a drying step.

4. The process as claimed in claim 3, wherein the mixture of polycarboxylic acids comprises 60% to 96% by weight of methylglutaric acid, 3.90% to 20.00% by weight of ethylsuccinic acid and 0.05% to 20.00% by weight of adipic acid.

5. A precipitated silica having:
    a BET specific surface area of between 45 and 550 m$^2$/g,
    a CTAB specific surface area of between 40 and 525 m$^2$/g,
    a content (C) of polycarboxylic acid+corresponding carboxylate, expressed as total carbon, of at least 0.15% by weight,
    an object size distribution width Ld ((d84−d16)/d50), measured by XDC particle size analysis after ultrasound deagglomeration, of at least 0.91, and
    a pore volume distribution such that the ratio $V_{(d5-d50)}/V_{(d5-d100)}$ is at least 0.65, and a dispersive component of the surface energy $\gamma_s^d$ of less than 52 mJ/m$^2$, wherein the polycarboxylic acid is at least one polycarboxylic acid selected from the group consisting of malonic acid, tricarballylic acid, glutaric acid, adipic acid, pimelic acid, suberic acid, azelaic acid, sebacic acid, methylsuccinic acid, ethylsuccinic acid, oxalosuccinic acid, methyladipic acid, methylglutaric acid, dimethylglutaric acid, fumaric acid, itaconic acid, muconic acid, aconitic acid, traumatic acid, glutaconic acid, malic acid, phthalic acid, ortophthalic acid, isophthalic acid, trimesic acid, trimellitic acid.

6. A precipitated silica having:
a BET specific surface area of between 45 and 550 m$^2$/g,
a CTAB specific surface area of between 40 and 525 m$^2$/g,
a content (C) of polycarboxylic acid+corresponding carboxylate, expressed as total carbon, of at least 0.15% by weight,
a pore distribution width ldp of greater than 0.65, and
a dispersive component of the surface energy $\gamma_s^d$ of less than 52 mJ/m$^2$,
wherein the polycarboxylic acid is at least one polycarboxylic acid selected from the group consisting of malonic acid, tricarballylic acid, glutaric acid, adipic acid, pimelic acid, suberic acid, azelaic acid, sebacic acid, methylsuccinic acid, ethylsuccinic acid, oxalosuccinic acid, methyladipic acid, methylglutaric acid, dimethylglutaric acid, fumaric acid, itaconic acid, muconic acid, aconitic acid, traumatic acid, glutaconic acid, malic acid, phthalic acid, ortophthalic acid, isophthalic acid, trimesic acid, trimellitic acid.

7. The precipitated silica as claimed in claim 5, content (C) of polycarboxylic acid+corresponding carboxylate, expressed as total carbon, of the precipitated silica is at least 0.24% by weight.

8. A method for reinforcing a polymer, the method comprising adding a precipitated silica as claimed in claim 5 to the polymer as a reinforcing filler.

9. A method for reducing the viscosity of a polymer composition, the method comprising adding the precipitated silica as claimed in claim 5 to the polymer composition.

10. A polymer composition comprising a precipitated silica as claimed in claim 5.

11. An article comprising at least one composition as claimed in claim 10, wherein the article is selected from a footwear sole, a floor covering, a gas barrier, a flame-retardant material, a roller for cableways, a seal for domestic electrical appliances, a seal for liquid or gas pipes, a braking system seal, a pipe, a sheathing, a cable, an engine support, a battery separator, a conveyor belt, a transmission belt and a tire.

12. The article as claimed in claim 11, wherein the article is a tire.

13. A method for reinforcing a polymer, the method comprising adding a precipitated silica as claimed in claim 6 to the polymer as a reinforcing filler.

14. A method for reducing the viscosity of a polymer composition, the method comprising adding the precipitated silica as claimed in claim 6 to the polymer composition.

15. A polymer composition comprising a precipitated silica as claimed in claim 6.

16. An article comprising at least one composition as claimed in claim 15, wherein the article is selected from a footwear sole, a floor covering, a gas barrier, a flame-retardant material, a roller for cableways, a seal for domestic electrical appliances, a seal for liquid or gas pipes, a braking system seal, a pipe, a sheathing, a cable, an engine support, a battery separator, a conveyor belt, a transmission belt and a tire.

17. The article as claimed in claim 16, wherein the article is a tire.

* * * * *